United States Patent

Weinberg et al.

[15] 3,683,279

[45] Aug. 8, 1972

[54] PHASE LOCKED LOOP

[72] Inventors: Murray Weinberg, Union; Irving A. Krause, Nutley, both of N.J.

[73] Assignee: International Telephone and Telegraph Corporation, Nutley, N.J.

[22] Filed: Dec. 17, 1969

[21] Appl. No.: 885,775

[52] U.S. Cl. ..........................325/63, 325/4, 325/17, 325/58, 325/346, 325/420, 343/6.8

[51] Int. Cl. ............................H04b 1/59, H04b 7/20

[58] Field of Search ........................325/3–11, 17, 58, 325/63, 346, 349, 419, 421, 423; 343/6.8

[56] References Cited

UNITED STATES PATENTS

| | | | |
|---|---|---|---|
| 3,525,945 | 8/1970 | Puente | 325/419 X |
| 3,444,556 | 5/1969 | Bellinger | 325/419 X |
| 3,461,388 | 8/1969 | Daley | 325/421 |
| 3,470,475 | 9/1969 | Peterson | 325/63 |
| 3,509,462 | 4/1970 | Ertman | 325/17 |
| 3,517,268 | 6/1970 | Webb | 325/419 X |

*Primary Examiner*—Robert L. Griffin
*Assistant Examiner*—Kenneth W. Weinstein
*Attorney*—C. Cornell Remsen, Jr., Walter J. Baum, Paul W. Hemminger, Percy P. Lantzy, Philip M. Bolton, Isidore Togut and Charles L. Johnson, Jr.

[57] ABSTRACT

An oscillator in a spacecraft transponder or repeater is frequency stabilized by a phase locked loop with reference signal therefor having a frequency (N/M) F being received in the repeater from a ground station. The reference signal is processed in the repeater and returned to the ground station where it is monitored to detect when the pull-in range of the loop is exceeded. When this condition is detected, the frequency of the reference signal is swept in the ground station until the frequency of the reference signal and frequency of the signal of the oscillator in the repeater is within said pull-in range. The oscillator frequency F is divided by M and the phase comparator includes a first tuned input circuit to respond to a frequency (N/M) F, a second turned input circuit to respond to the *n*th harmonic of the frequency F/M and a phase error detecting circuit to produce a control signal used to stabilize the frequency of the oscillator.

8 Claims, 1 Drawing Figure

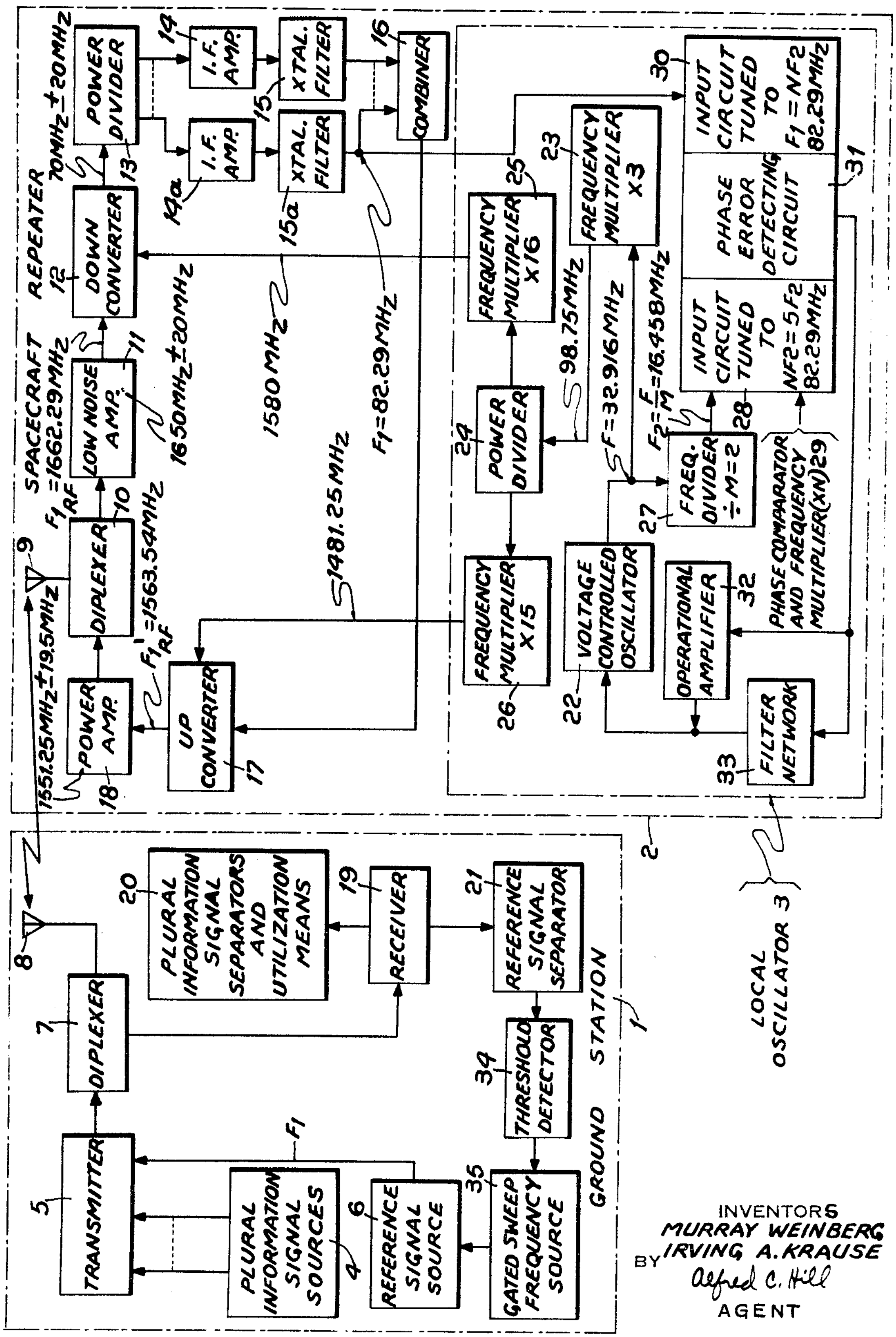
INVENTORS
MURRAY WEINBERG
IRVING A. KRAUSE
BY Alfred C. Hill
AGENT

PHASE LOCKED LOOP

BACKGROUND OF THE INVENTION

This invention relates to an information transmission system and, more particularly, to a phase locked loop employed therein.

The transponder or repeater to which the present invention is applicable has application for multi-purpose communication, navigation and data link satellites. The transponder is designed to receive a number of frequency spaced voice modulated carriers simultaneously, process them separately so that they are retransmitted at the right frequency and power along the desired propagation path, for instance, the satellite-to-ground and satellite-to-aircraft paths.

The local oscillator employed in a repeater of this type have, in the past, been frequency stabilized by employing ovens, but as is obvious when the local oscillator is employed in a spacecraft repeater or transponder, where the spacecraft may be, for instance, an airplane, a communication link satellite, or a manned or unmanned space probe, frequency stabilization by employing ovens present a weight and power supply problem.

To overcome this problem with frequency stabilizing ovens, crystal oscillators have been employed as the local oscillator incorporating therewith a phase locked loop for frequency stabilization. It is well known that a reference frequency must be applied to the phase comparator of a phase locked loop to produce the phase control signal for frequency stabilization of the oscillator frequency. In addition, if there is a possibility of the reference signal frequency and the oscillator frequency differing from each other by an amount greater than the pull-in range of a phase locked loop, it is necessary to provide additional circuitry whereby the reference frequency is swept in frequency until the difference in frequency between the two signals is within the pull-in range of the phase locked loop so that the phase locked loop can properly operate for frequency stabilization of the oscillator output frequency. In the past, the reference frequency signal source and the frequency sweeping arrangement for this source has been provided at the same location as the phase locked loop and as a result, under certain circumstances, provides a weight and power supply requirement problem.

SUMMARY OF THE INVENTION

An object of the present invention is to provide a phase locked loop frequency stabilization system to be carried on board a spacecraft, such as an airplane, communication satellite, or a manned or unmanned space probe that has reduced weight relative to the prior art phase locked loop arrangements.

Another object of the present invention is to provide an improved phase locked loop particularly applicable to a transponder or repeater carried on board a spacecraft having a reduction in weight and power supply requirements.

A feature of the present invention is the provision, in an information transmission system having at least two spaced stations in communication with each other, of a phase locked loop to stabilize the frequency of an oscillator disposed in one of the stations comprising said oscillator having an output frequency F; a source of reference signal having a frequency (N/M) F, where N and M are different integers greater than 1, the source being disposed in the other of the stations; first means disposed in the one of the stations coupled to multiply the frequency F by a factor (N/M) and to compare the phase relation between the multiplied frequency F and the reference signal received from the other of the stations to produce a phase control signal; and second means disposed in the one of the stations to couple the control signal to the oscillator for frequency stabilization thereof.

Another feature of the present invention is to provide in combination with the equipment of the foregoing feature third means disposed in the other of the stations coupled to the source to sweep the frequency of the reference signal when the pull-in range of the loop is exceeded; and fourth means disposed in the other of the stations coupled to respond to a predetermined signal received from the one of the stations to activate the third means when the predetermined signal has a given characteristic indicating that the pull-in range is exceeded.

A further feature of the present invention is the provision of a circuit arrangement to produce a control signal indicative of the phase relationship between a first signal having a frequency F and a second signal having a frequency NF, where N is an integer greater than 1, comprising a first circuit tuned to frequency NF; a second circuit tuned to respond to the Nth harmonic of frequency F; and a phase error detecting circuit coupled to the first and second circuits to provide the control signal.

BRIEF DESCRIPTION OF THE DRAWING

The above-mentioned and other features and objects of this invention will become more apparent by reference to the following description taken in conjunction with the accompanying drawings, in which the sole FIGURE is a block diagram of an information transmission system incorporating one embodiment of the phase locked loop in accordance with the principles of the present invention.

DESCRIPTION OF THE PREFERRED EMBODIMENT

Referring to the FIGURE, there is illustrated therein a block diagram of an information transmission system including a ground station 1 and a transponder or repeater 2 carried on board a spacecraft incorporating a local oscillator 3 including therein the phase locked loop in accordance with the principles of this invention.

While the drawing and the description herein is directed to an information transmission system of a type including a ground station and a transponder or repeater carried by a spacecraft, the techniques disclosed herein are not necessarily limited to this type of information transmission system, but rather may be employed in any information transmission system incorporating two spaced stations in communication with each other.

Ground station 1 incorporates therein plural information signal sources 4 separated in frequency by employing different carrier frequencies which are modulated with the information signal in transmitter 5. Coupled to transmitter 5 along with the information signals from sources 4 is a reference signal from source 6 having a given frequency so as to produce a desired reference frequency F1 = 82.29 MHz (megahertz) in spacecraft repeater 2. The frequencies mentioned herein and shown in the drawing are for purposes of explanation and do not necessarily limit the disclosure herein to these particular frequencies, since the techniques disclosed herein may be readily modified for operation with other frequencies.

The output from transmitter 5 is coupled to diplexer 7 and, hence, to antenna 8 for transmission to antenna 9 and diplexer 10 of repeater 2. For purposes of illustration, in the up link from station 1 to repeater 2 the signal is centered at 1,650 MHz with a bandwidth of ± 20 MHz. The receiver of repeater 2 includes low noise amplifier 11 and down-converter 12 receiving a local oscillator signal from oscillator 3 as illustrated to produce an IF (intermediate frequency) signal centered at 70 MHz with a bandwidth of ± 20 MHz. The IF output of converter 12 is applied to power divider 13 for coupling the IF signal to frequency separating channel equipment to maintain the modulated carriers and reference signal separated. The channel equipment each includes IF amplifiers 14 and crystal filters 15. The outputs of filters 15 are coupled to combiner 16 whose output is coupled to up-converter 17 which receives its local oscillator signal from oscillator 3 having the value illustrated to provide an RF (radio frequency) signal for the down link from repeater 2 to a ground station, such as station 2 having a frequency centered at 1,551.25 MHz with a bandwidth of 19.5 MHz. The output of converter 17 is coupled to power amplifier 18 and, hence, to diplexer 10 and antenna 9 for transmission to other stations and the originating ground station 1 via antenna 8 and diplexer 7. The received signal at ground station 1 via diplexer 7 is coupled to receiver 19 whose output is coupled to information signal separators and utilization means 20 and to reference signal separator 21. The separators 20 and 21 may be similar to those employed in repeater 2 where each channel includes a properly tuned IF amplifier and crystal filter.

The local oscillator 3 of repeater 2 includes therein voltage controlled oscillator 22 which is the master oscillator for repeater 2 enabling the production of the local oscillator signals for down-converter 12 and up-converter 17. This is accomplished by coupling the output of oscillator 22 to a frequency multiplier 23. As illustrated multiplier 23 multiplies the frequency F = 32.916 MHz by a factor of three. This multiplied frequency signal of 98.75 MHz is applied to power divider 24 and, hence, to frequency multiplier 25 having a frequency multiplication factor of 16 for producing the local oscillator signal of 1,580 MHz for down-converter 12 and to frequency multiplier 26 having a multiplication factor of 15 for producing the local oscillator signal of up-converter 17.

To provide frequency stability for oscillator 22 there is disclosed a phase locked loop system wherein the output of oscillator 22 is coupled to frequency divider 27 which divides the frequency of the output signal of oscillator 22 by a factor M. The output of divider 27 is coupled to input circuit 28 of phase comparator and frequency multiplier 29. The input circuit 28 is tuned to respond to the Nth harmonic of the frequency of the output signal of divider 27. If it is assumed that M equals 2 and N equals 5 as illustrated, the frequency of the output signal of oscillator 22 has been multiplied by a factor of 2.5 through the cooperation of divider 27 and input circuit 28. The reference signal rather than being provided in repeater 2 is transmitted from source 6 of ground station 1 to the repeater 2 and is separated from the other information signals by IF amplifier 14a and crystal filter 15a for application to input circuit 30 of phase comparator and frequency multiplier 29. Input circuit 30 is tuned to the reference signal frequency F1 which, in turn, is equal to NF2, where F2 is the frequency of the output signal from divider 27. The signals present in input circuits 28 and 30 are coupled in a known manner to a known phase error detecting circuit 31 (the usual phase comparator circuit coupled to the input circuits) of phase comparator and frequency multiplier 29 which produces a phase control signal which is applied to oscillator 22 at baseband by means of operational amplifier 32 disposed in parallel relation to the filter network 33.

This phase locked loop as described will frequency stabilize oscillator 22 as long as the frequency of the signals coupled to input circuits 28 and 30 remain within a given frequency difference, namely, the operative pull-in range of the phase locked loop. The term "-pull-in" range is that range of frequency differences between the reference frequency and the oscillator frequency where the phase locked loop is effective to perform the desired frequency stabilization. If due to temperature, component and other variations, the frequency of the two signals in input circuits 28 and 30 should exceed the pull-in range this would result through the operation of converter 12 and its frequency inaccurate local oscillator signal in a shifting of the reference frequency F1 from the center of filter 15a and, hence, a reduction in the amplitude of the reference signal to a value below a threshold value related to the maximum pull-in range. This reduced amplitude reference signal would be coupled to combiner 16, up converter 17, amplifier 18 and to diplexer 10 for transmission from antenna 9. The reduced amplitude reference signal transmitted would be received at ground station 1 in reference signal separator 21 and would be coupled to threshold detector 34. The output from detector 34 will be such that the sweep frequency source 35 will be activated or gated to sweep the frequency of the reference signal in source 6. This frequency sweeping of the frequency of the reference signal will be transmitted to the input circuit 30 of phase comparator and frequency multiplier 29 until the frequency difference between the two signals is again within the pull-in range of the phase locked loop. Once this condition is achieved the amplitude of the reference signal at the output of separator 21 will be such that the detector 34 stops the sweeping of the frequency of the reference signal from source 6 by source 35.

Threshold detector 34 may be the type that produces a finite output signal at all times when its threshold level is exceeded and an absence of output signal when the amplitude of the input signal is less than its threshold level. The output of detector 34 would then be coupled to an INHIBIT gate in the output circuit of the sweep frequency source 35. This responds to the finite output signal to prevent sweeping the frequency of the reference signal of source 6 and to the absence of control signal to sweep the frequency of the reference signal. On the other hand, threshold detector 34 may be the type that produces a finite output signal only when the amplitude of the signal from separator 21 is lower than its threshold value and an absence of output signal when the amplitude of the signal from separator 21 exceeds its threshold value. In this circumstance, an AND gate in the output of source 35 will respond to the absence of output signal from detector 34 to prevent sweeping the frequency of the reference signal of source 6 except when a finite output signal is provided by detector 34.

While we have described above the principles of our invention in connection with specific apparatus, it is to be clearly understood that this description is made only by way of example and not as a limitation to the scope of our invention as set forth in the objects thereof and in the accompanying claims.

We claim:

1. In an information transmission system having at least two spaced stations in communication with each other, a phase locked loop to stabilize the frequency of an oscillator disposed in one of said stations comprising:
   said oscillator having an output frequency F;
   a source of reference signal having a frequency (N/M) F, where N and M are different integers greater than one such that (N/M) is a fractional number, said source being disposed in the other of said stations;
   first means disposed in said one of said stations coupled to perform the combined function of multiplying said frequency F by a factor (N/M) and comparing the phase relation between said multiplied frequency F and said reference signal received from said other of said stations to produce a phase control signal;
   second means disposed in said one of said stations to couple said control signal to said oscillator for frequency stabilization thereof;
   third means disposed in said other of said stations coupled to said source to sweep the frequency of said reference signal when the pull-in range of said loop is exceeded, said pull-in range being that range of frequency differences between the frequency of said reference signal and said output frequency of said oscillator where said loop is effective to perform the desired frequency stabilization; and
   fourth means disposed in said other of said stations coupled to respond to said reference signal received from said one of said stations to activate said third means when said reference signal has an amplitude less than a given threshold value indicating that said pull-in range is exceeded.

2. A phase locked loop according to claim 1, wherein said first means includes
   fifth means coupled to the output of said oscillator to divide said frequency F by M,
   sixth means tuned to frequency (N/M) F to respond to said reference signal received from said other of said stations,
   seventh means tuned to respond to the Nth harmonic of the frequency F/M at the output of said first means, and
   eighth means coupled to said sixth and seventh means to produce said control signal.

3. A phase locked loop according to claim 2, wherein said second means includes
   a filter network coupled between the output of said first means and the frequency control input of said oscillator, and
   an operational amplifier coupled in parallel with said filter network.

4. A phase locked loop according to claim 1, wherein said second means includes
   a filter network coupled between the output of said first means and the frequency control input of said oscillator, and
   an operational amplifier coupled in parallel with said filter network.

5. In an information transmission system having at least two spaced stations in communication with each other, a phase locked loop to stabilize the frequency of an oscillator disposed in one of said stations comprising:
   said oscillator having an output signal F;
   a source of reference signal having a frequency (N/M) F, where N and M are different integers greater than 1, said source being disposed in the other of said stations;
   first means disposed in said one of said stations coupled to perform the combined function of multiplying said frequency F by a factor (N/M) and comparing the phase relation between said multiplied frequency F and said reference signal received from said other of said stations to produce a phase control signal;
   second means disposed in said one of said stations to couple said control signal to said oscillator for frequency stabilization thereof;
   third means disposed in said other of said stations coupled to said source to sweep the frequency of said reference signal when the pull-in range of said loop is exceeded, said pull-in range being that range of frequency differences between the frequency of said reference signal and said output frequency of said oscillator where said loop is effective to perform the desired frequency stabilization; and
   fourth means disposed in said other of said stations coupled to respond to said reference signal received from said one of said stations to activate said third means when said reference signal has an amplitude less than a given threshold value indicating that said pull-in range is exceeded.

6. A phase locked loop according to claim 5, wherein said first means includes
   fifth means coupled to the output of said oscillator to divide said frequency F by M,
   sixth means tuned to frequency (N/M) F to respond to said reference signal received from said other of said stations,
   seventh means tuned to respond to the Nth harmonic of the frequency F/M at the output of said first means, and
   eighth means coupled to said sixth and seventh means to produce said control signal.

7. A phase locked loop according to claim 6, wherein said second means includes a filter network coupled between the output of said first means and the frequency control input of said oscillator, and an operational amplifier coupled in parallel with said filter network.

8. A phase locked loop according to claim 5, wherein said second means includes a filter network coupled between the output of said first means and the frequency control input of said oscillator, and an operational amplifier coupled in parallel with said filter network.

* * * * *